(12) United States Patent
Etla et al.

(10) Patent No.: US 11,277,342 B2
(45) Date of Patent: Mar. 15, 2022

(54) LOSSLESS DATA TRAFFIC DEADLOCK MANAGEMENT SYSTEM

(71) Applicant: Dell Products L.P., Round Rock, TX (US)

(72) Inventors: Venkata Gouri Rajesh Etla, Andhra Pradesh (IN); Vidya Chidambaram, Chennai (IN)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 16/667,075

(22) Filed: Oct. 29, 2019

(65) Prior Publication Data

US 2021/0126865 A1    Apr. 29, 2021

(51) Int. Cl.
| | |
|---|---|
| H04L 12/803 | (2013.01) |
| H04L 47/122 | (2022.01) |
| H04L 45/00 | (2022.01) |
| H04L 41/0681 | (2022.01) |
| H04L 47/2475 | (2022.01) |

(52) U.S. Cl.
CPC ........ *H04L 47/122* (2013.01); *H04L 41/0681* (2013.01); *H04L 45/22* (2013.01); *H04L 45/38* (2013.01); *H04L 47/2475* (2013.01)

(58) Field of Classification Search
None
See application file for complete search history.

(56) References Cited

U.S. PATENT DOCUMENTS

| | | | | |
|---|---|---|---|---|
| 6,201,810 B1* | 3/2001 | Masuda | .................. | H04L 45/04 370/237 |
| 9,929,829 B1* | 3/2018 | Huang | ...................... | H04L 1/00 |
| 2005/0033531 A1* | 2/2005 | Lay | ....................... | H04L 49/506 702/55 |
| 2012/0069739 A1* | 3/2012 | Yabusaki | ............ | H04L 43/0888 370/235 |
| 2014/0204738 A1* | 7/2014 | Carter | ................... | H04L 47/122 370/230 |

* cited by examiner

*Primary Examiner* — Alex Skripnikov
(74) *Attorney, Agent, or Firm* — Joseph Mencher

(57) ABSTRACT

A lossless data traffic deadlock management system includes a first networking device coupled to a second networking device and a third networking device. The first networking device provide a lossless data traffic flow on a first data traffic path via the second networking device and to a destination. The first networking device then receives a congestion communication from the second networking device that is indicative of a deadlock associated with the second networking device. In response, the first networking device identifies the first data traffic path as a congested route, and the identification of the first data traffic path as the congested route causes the first networking device to provide the lossless data traffic flow on a second data traffic path via the third networking device to the destination.

17 Claims, 11 Drawing Sheets

LOSSLESS DATA TRAFFIC DEADLOCK MANAGEMENT SYSTEM

BACKGROUND

The present disclosure relates generally to information handling systems, and more particularly to managing deadlocks when routing lossless data traffic using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as networking devices are often utilized to route data traffic that may include "lossless" data traffic. As will be appreciated by one of skill in the art, the transmission of such lossless data traffic may be enabled via the use of mechanisms such as Priority Flow Control (PFC) to prevent data packet loss due to congestion in the networking devices. PFC mechanisms utilized by a networking device typically operate via the use of PFC pause frames that are sent in a direction that is opposite of the received data traffic and to "upstream" devices in order to notify those upstream devices to reduce the rate that they transmit data traffic until the congestion issues in the networking device have subsided. However, the use of PFC mechanisms can result in some issues. For example, the configuration of networking devices and data traffic flows handled by those networking devices can sometimes result in a phenomenon referred to as a Cyclic Buffer Dependency (CBD) situation.

In a simple example, each of a first networking device, a second networking device, and a third networking device may be directly connected to teach other, with the first networking device receiving a first data traffic flow and forwarding that first data traffic flow through the second networking device and the third networking device, the second networking device receiving a second data traffic flow and forwarding that second data traffic flow through the third networking device and the first networking device, and the third networking device receiving a third data traffic flow and forwarding that third data traffic flow through the first networking device and the second networking device. As will be appreciated by one of skill in the art, in event each of the first, second, and third data traffic flows include lossless data, each of the first, second, and third data traffic flows may utilize buffers in the first, second, and third networking devices that are dedicated to storing lossless data traffic packets/frames. In the event there is congestion in the third networking device, a CBD situation may arise where the third networking device will send PFC pause frames to the second networking device until the buffer/queue in the second networking device is filled with lossless data traffic packets/frames, the second networking device will send PFC pause frames to the first networking device until the buffer/queue in the first networking device is filled with lossless data traffic packets/frames, the first networking device will send PFC pause frames to the third networking device until the buffer/queue in the third networking device is filled with lossless data traffic packets/frames, and so on, which one of skill in the art will appreciate will also result in a large number of PFC pause frames being sent to any devices that are directly connected to the first, second, and third networking devices.

The inventors of the present disclosure have discovered that lossless data traffic flows may be dropped indefinitely in some Layer 3 (L3) networking devices because of congestion in a portion of the network, even when an alternate path to the destination of those lossless data traffic flows exists. Continuing with the example above, a fourth networking device may have a first path via the second networking device to a destination, and a second path via a fifth networking device to the destination, with the first path and the second path having equal cost. The fourth networking device may execute a hashing algorithm to select the first path via the second networking device for a fourth data traffic flow, and the second networking device may subsequently become involved in the CBD situation described above with the first and third networking devices, resulting in the second networking device sending large numbers of PFC pause frames to the fourth networking device. Such CDB situations can result in situations referred to as "PFC storms" due to the high number of PFC pause frames being received at particular ports on the networking devices, which can result in networking devices dropping data traffic flows that are transmitted via the congested networking device that is transmitting the PFC pause frames. As such, despite the availability of the second path via the fifth networking device to the destination, the hashing algorithm executed by the fourth networking device will be unaware of the congestion in the second networking device, and the fourth networking device may drop the fourth data traffic flow indefinitely.

Conventional solutions to such issues utilize a PFC "watchdog" mechanism at each port that is configured to detect and mitigate such PFC storm situations. Such PFC watchdog mechanisms detect when relatively high numbers of PFC pause frames are associated with their port, and attempt to mitigate the results by refusing to accept any additional lossless data traffic. For example, such conventional systems may operate to poll any lossless buffers/queues associated with respective ports handling lossless data traffic flows at particular polling intervals and, in the event a buffer/queue includes data traffic and the corresponding egress counter is not being incremented (e.g., due to pause operations resulting from the receiving of PFC pause frames) for some number of polling intervals, a PFC storm situation may be detected. In response, the data packets associated with that port may be refused at the ingress of the networking device. When PFC pause frames are no longer received at that port for some number of polling intervals (or some other time period passes), the PFC storm will be determined to be over, and the data packets associated with that port may be again received at the ingress of the networking device discussed above. As will be appreciated by one of skill in the art in possession of the present disclosure, such PFC watchdog solutions can result in the dropping of lossless data traffic at the upstream networking device Accordingly, it would be desirable to provide a deadlock management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a deadlock management engine that is configured to: provide, on a first data traffic path via a second networking device and to a destination, a lossless data traffic flow; receive, from the second networking device, a congestion communication that is indicative of a deadlock associated with the second networking device; and identify, in response to receiving the congestion communication, the first data traffic path as a congested route, wherein the identification of the first data traffic path as the congested route causes the first networking device to provide the lossless data traffic flow on a second data traffic path via a third networking device to the destination.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
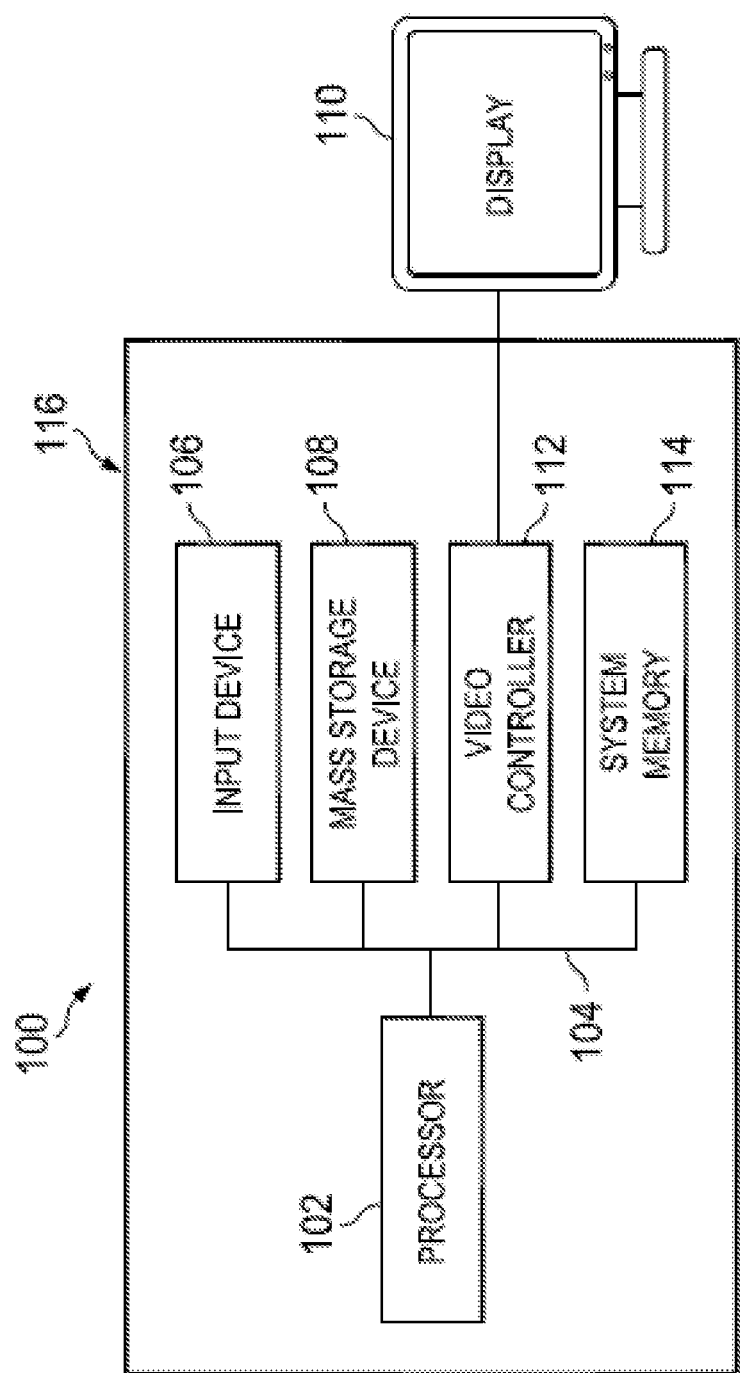
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
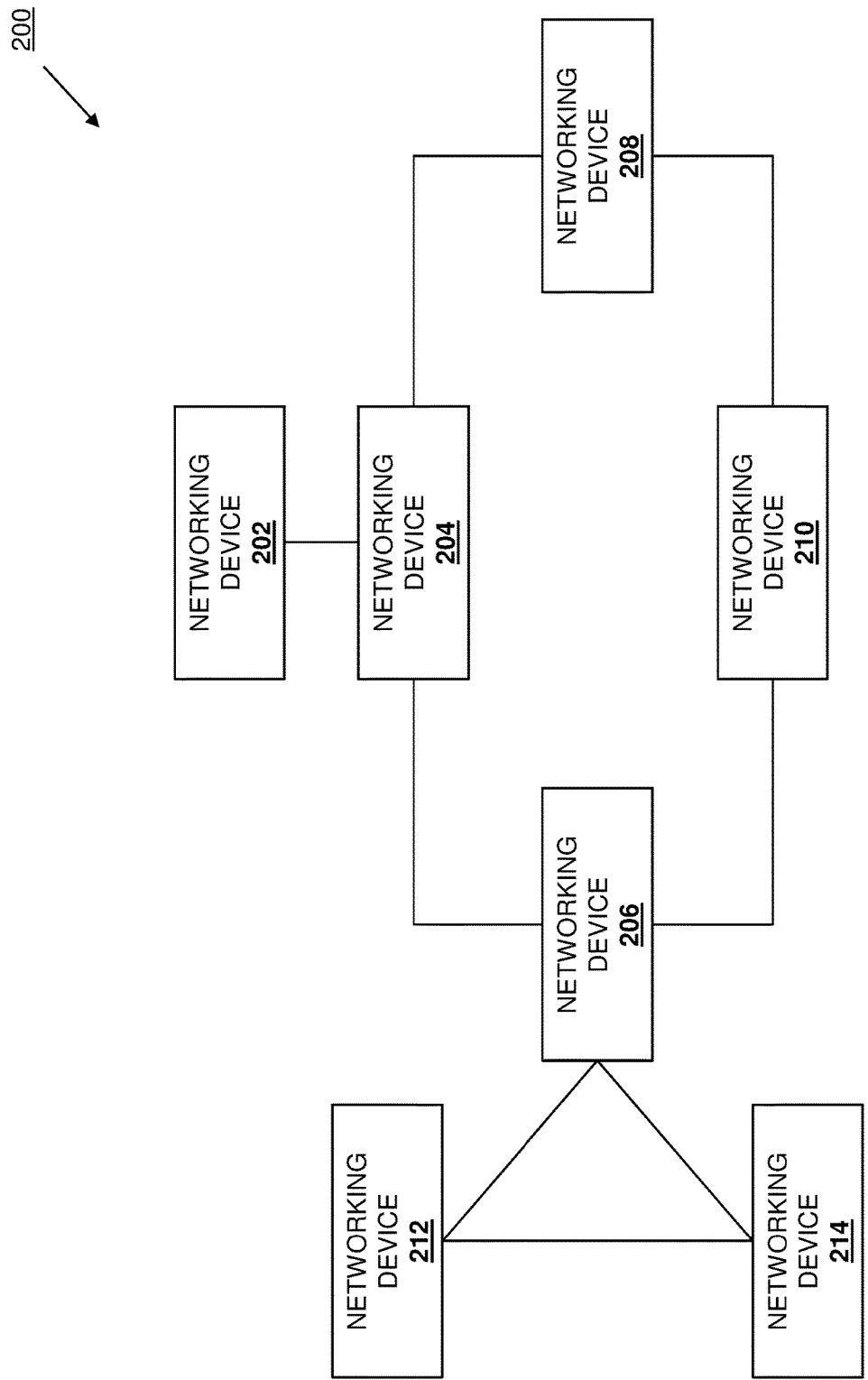
FIG. 2 is a schematic view illustrating an embodiment of a lossless data traffic deadlock management system.

Referring now to FIG. 2, an embodiment of a lossless data traffic deadlock management system 200 is illustrated. In the illustrated embodiment, the lossless data traffic deadlock management system 200 incudes a plurality of networking devices including a networking device 202, a networking device 204 coupled to the networking device 202, a pair of networking devices 206 and 208 each coupled to the networking device 204, a networking device 210 coupled to each of the networking devices 206 and 208, and a pair of networking devices 212 and 214 that are each coupled to the networking device 206 and to each other. In an embodiment, any or all of the networking devices 202-214 may be provided by the IHS 100 discussed above with reference to FIG. 1, and/or may include some or all of the components of the IHS 100, and in the specific examples are described as being provided by switch devices. However, while illustrated and discussed as a switch devices, one of skill in the art in possession of the present disclosure will recognize that networking devices provided in the lossless data traffic deadlock management system 200 may include any devices that may be configured to operate similarly as the networking devices discussed below. In the specific examples provided below, the networking devices 206, 212 and 214 experience a Cyclic Buffer Dependency (CBD) situation, while the networking device 204 performs the lossless data traffic deadlock management of the present disclosure based on that CBD situation. However, while a specific lossless data traffic deadlock management system 200 has been illustrated and described, one of skill in the art in possession of the present disclosure will recognize that the lossless data traffic deadlock management system of the present disclosure may include a variety of components and component configurations while remaining within the scope of the present disclosure as well.

Figure 3:
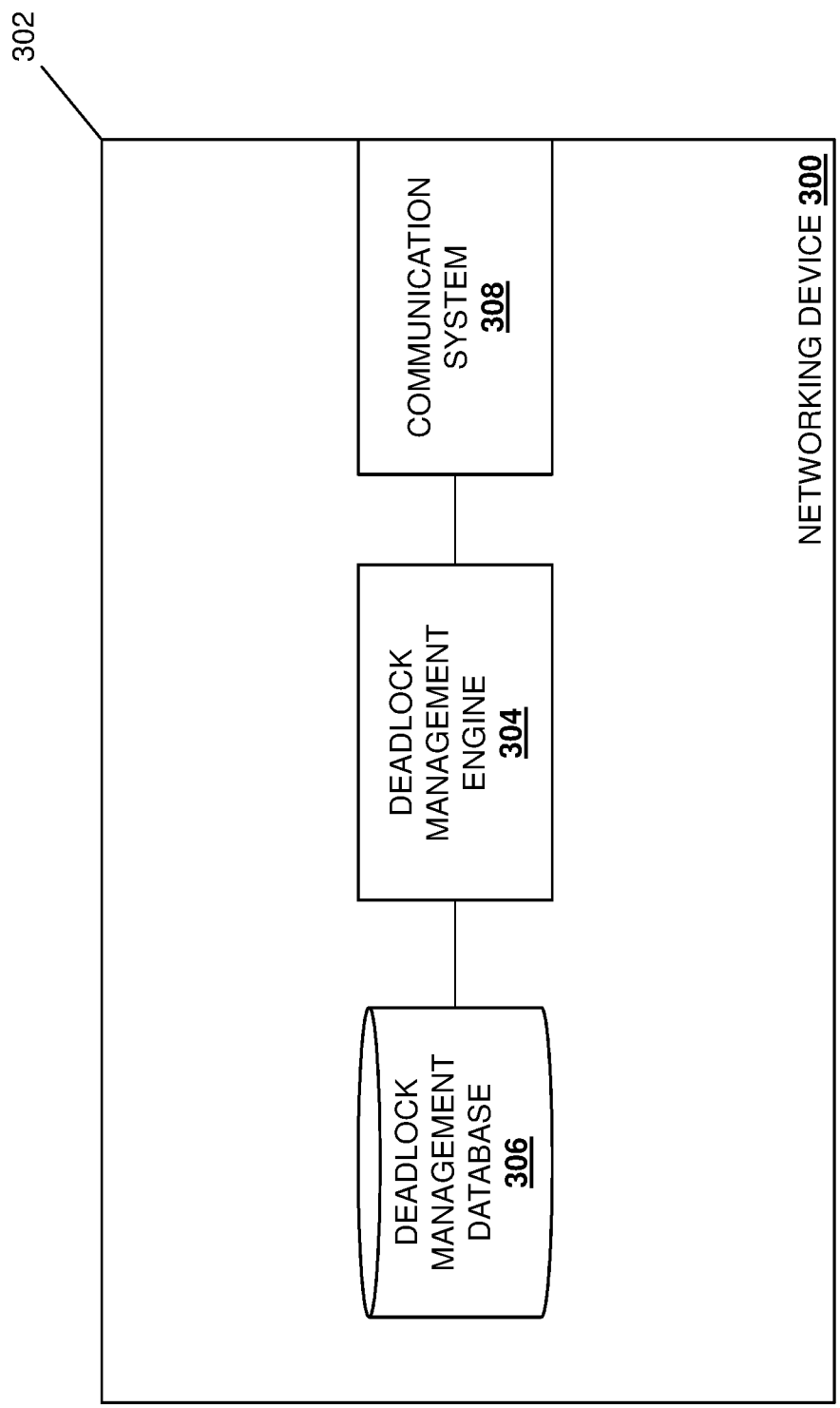
FIG. 3 is a schematic view illustrating an embodiment of a networking device that may be provided in the lossless data traffic deadlock management system of FIG. 2.

Referring now to FIG. 3, an embodiment of a networking device 300 is illustrated that may provide any or all of the networking devices 202-214 discussed above with reference to FIG. 2. As such, the networking device 300 may be provided by the IHS 100 discussed above with reference to FIG. 1 and/or may include some or all of the components of the IHS 100. Furthermore, while illustrated and discussed as a networking device 300, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a deadlock management engine 304 that is configured to perform the functionality of the deadlock management engines and/or networking devices discussed below.

The chassis 302 may also house a storage system (not illustrated, but which may include the storage 108 discussed above with reference to FIG. 1) that is coupled to the deadlock management engine 304 (e.g., via a coupling between the storage system and the processing system) and that includes a deadlock management database 306 that is configured to store any of the information utilized by the deadlock management engine 304 discussed below. The chassis 302 may also house a communication system 308 that is coupled to the deadlock management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
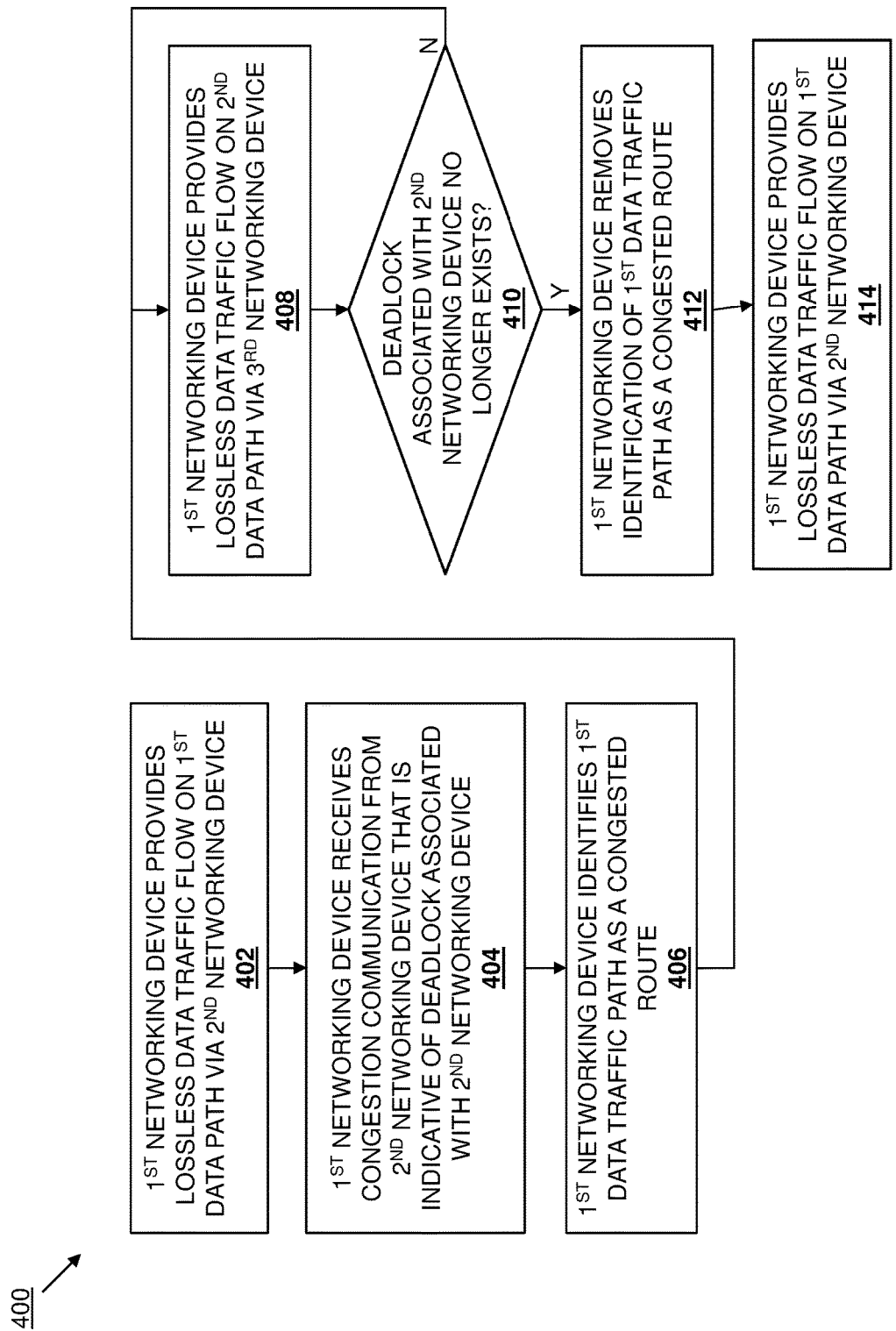
FIG. 4 is a flow chart illustrating an embodiment of a method for managing deadlocks for lossless data traffic.

Referring now to FIG. 4, an embodiment of a method 400 for managing deadlocks when routing lossless data traffic is illustrated. As discussed below, the systems and methods of the present disclosure provide for the transmission of lossless data traffic with improved resolution of deadlocks without the issues associated with the utilization of the conventional solutions discussed above. As discussed below, in some embodiments, such deadlock resolution may be accomplished by a first networking device that provides a lossless data traffic flow on a first data traffic path via a second networking device and to a destination, receive a congestion communication from the second networking device that is indicative of a deadlock associated with the second networking device and, in response, identifies the first data traffic path as a congested route to cause the first networking device to provide the lossless data traffic flow on a second data traffic path via a third networking device to the destination. Identifying deadlock condition conditions in such a manner allows the networking device to utilize alternative route(s) between a source device a destination device, and route the lossless data traffic to the destination device via an alternate route. As discussed in further detail below, this allows the first networking device to increase the performance of lossless data traffic transmission a between a source device and the destination device by rerouting traffic around deadlocks, thus allowing deadlocks to resolve more quickly than in conventional systems due to decreased amount of lossless data traffic sent to the congested networking device.

Figure 5:
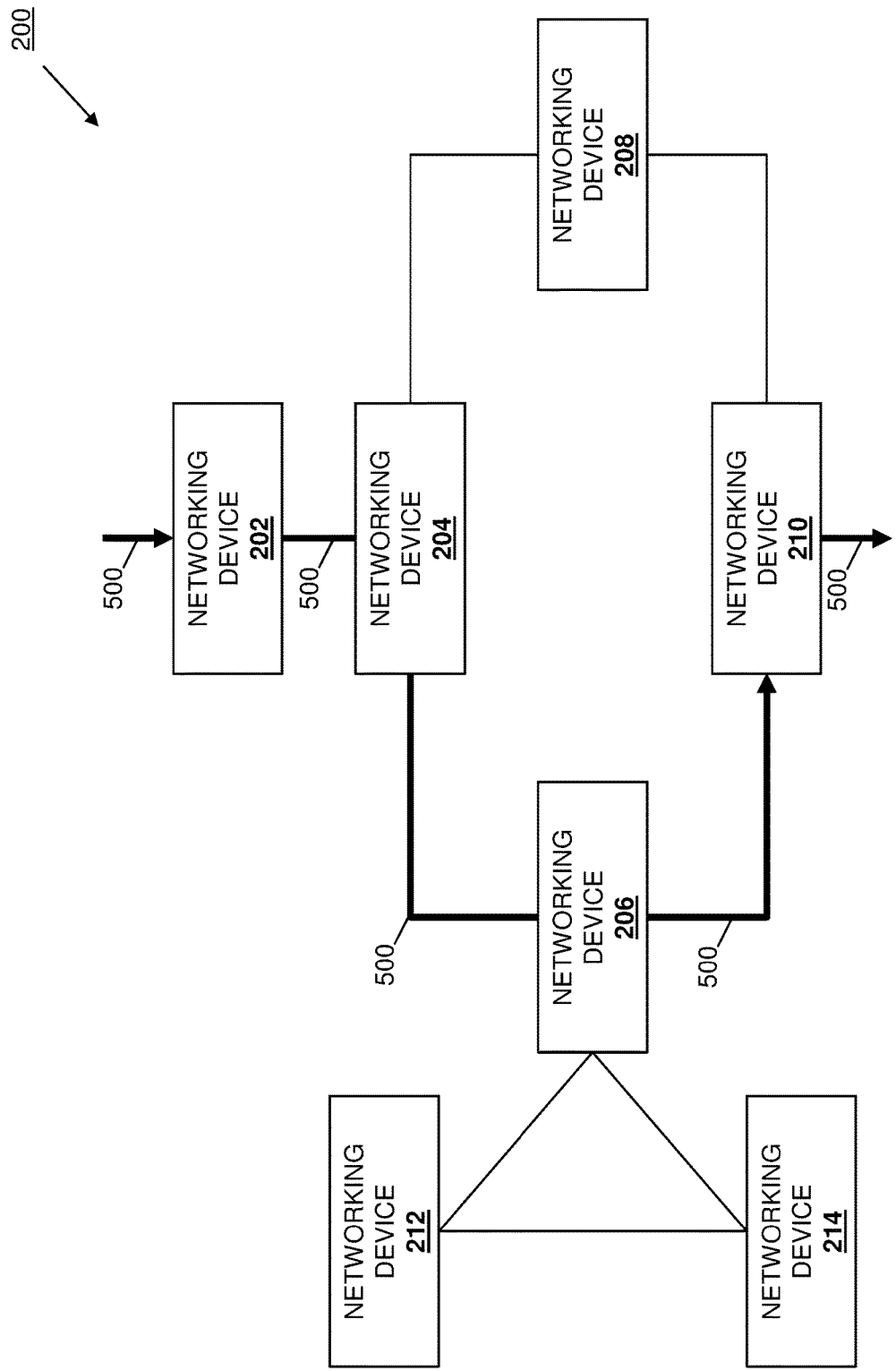
FIG. 5 is a schematic view illustrating the lossless data traffic deadlock management system of FIG. 2 operating during the method of FIG. 4.

The method 400 begins at block 402 where a first networking device provides a lossless data traffic flow on a first data traffic path via a second networking device. In an embodiment, at block 402, the deadlock management engine 304 in the networking device 204/300 may operate to provide a lossless data traffic flow 500 along a first data traffic path. For example, as illustrated in FIG. 5, the lossless data traffic flow 500 (e.g., generated by a source device, not illustrated) may be received by the networking device 202 and forwarded to the networking device 204 such that it is received by the deadlock management engine 304 in the networking device 204/300 via its communication system 308. As would be appreciated by one of skill in the art in possession of the present disclosure, in the examples provided below, the networking device 206 (and the networking device 210) may provide a first data traffic path from the networking device 204 to a destination device that is the destination of the lossless data traffic flow 500, while the networking device 208 (and the networking device 210) may provide a second data traffic path from the networking device 204 to the destination device that is the destination of the lossless data traffic flow 500 and that has an "equal cost" relative to the first data traffic path according to the Equal Cost Multi-Path (ECMP) routing strategy utilized in the examples below. Thus, in a specific example, the networking device 204 may include equal Layer 3 (L3) paths to the networking device 210 via respective ports (e.g., "port 1" and "port 2", respectively) and respective VLANs (e.g., "VLAN 10" and "VLAN 20"), resulting in the following ECMP routes being stored in the deadlock management database 306 in the networking device 204 in association with the networking device 210: route 1—networking device 206, VLAN 10, port 1; and route 2—networking device 208, VLAN 20, port 2. However, while a particular routing strategy is described, one of skill in the art in possession of the present disclosure will appreciate that other routing strategies may be utilized with the teachings of the present disclosure while remaining within the scope of the present disclosure.

As such, in an example of the routing of the data traffic flow 500 utilizing ECMP routing strategies, the deadlock management engine in the networking device 204/300 may operate to perform a hashing operation on the lossless data traffic flow 500 to determine that that lossless data traffic flow should be forwarded out of a port on the networking device 204 that is coupled to the networking device 206, and as illustrated, that hashing operation results in the data traffic flow 500 being forwarded along the first data traffic path illustrated in FIG. 5 such that it is received by the networking device 206, forwarded by the networking device 206 to the networking device 210, received by the networking device 210, and forwarded by the networking device 210 to a destination device (not illustrated.) As will be appreciated by one of skill in the art in possession of the present disclosure, other data traffic flows received by the networking device 204 may be subject to the same hashing operation discussed above in order to provide those data traffic flows along different data traffic paths (e.g., the second data traffic path from the networking device 204 via the networking devices 208 and 210 discussed above) as well, with the hashing operation performed on the data traffic flows distributing the data traffic flows substantially equality between the data traffic paths from the networking device 204 provided by each of the networking devices 206 and 208. As such, as long as networking devices in the deadlock management system 200 does not experience congestion, the data traffic flow 500 may be forwarded on the first data traffic path illustrated in FIG. 5. Furthermore, while only two data traffic paths are illustrated with the second data traffic path providing an alternate path relative to the first data traffic path in the examples below, one of skill in the art in possession of the present disclosure will appreciated that more data traffic paths may be available such that more alternate paths are available relative to the first data traffic path while remaining within the scope of the present disclosure as well.

Figure 6A:
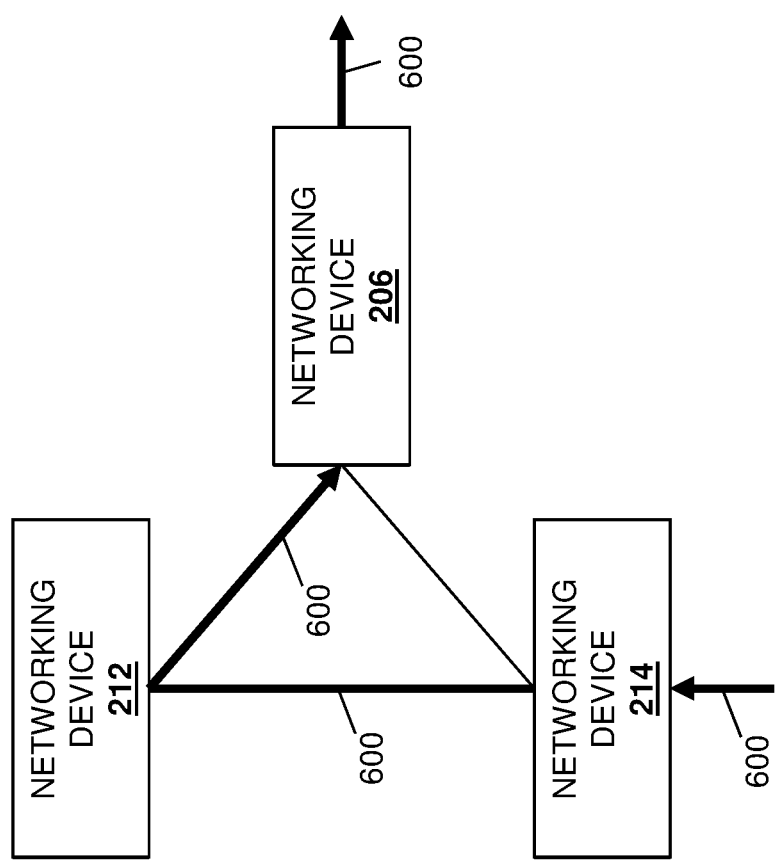
FIG. 6A is a schematic view illustrating an embodiment of a portion of the lossless data traffic deadlock management system of FIG. 2 operating during the method of FIG. 4.
Figure 6B:
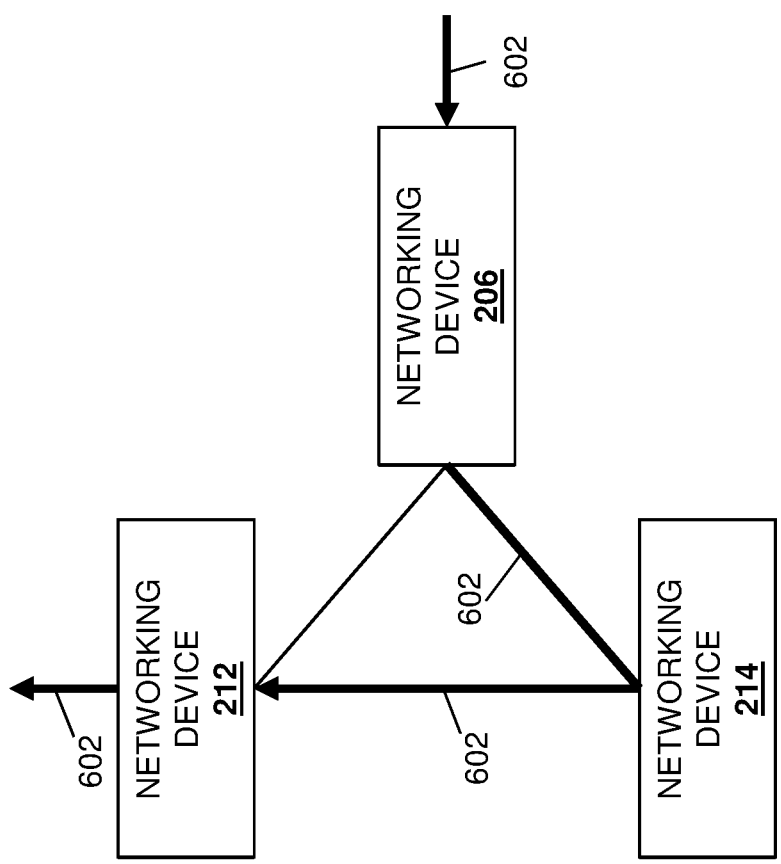
FIG. 6B is a schematic view illustrating an embodiment of a portion of the lossless data traffic deadlock management system of FIG. 2 operating during the method of FIG. 4.
Figure 6C:
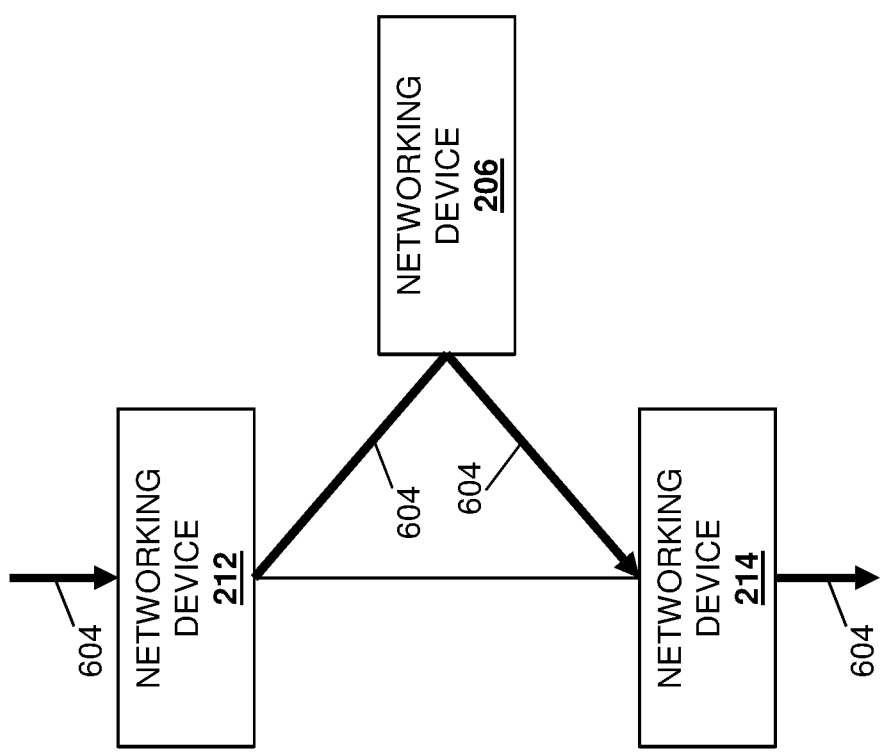
FIG. 6C is a schematic view illustrating an embodiment of a portion of the lossless data traffic deadlock management system of FIG. 2 operating during the method of FIG. 4.

The method 400 the proceeds to block 404 where the first networking device receives a congestion communication from the second networking device that is indicative of a deadlock associated with the second networking device. In an embodiment, at or prior to block 404, a congestion condition may arise in the deadlock management system 200. For example, with reference to the networking devices 206, 212, and 214 in the deadlock management system 200 illustrated in FIGS. 6A, 6B, 6C, and 6D, a Cyclic Buffer Dependency (CBD) situation may arise. FIG. 6A illustrates the networking device 214 receiving a lossless data traffic flow 600 and forwarding it to the networking device 212, the networking device 212 receiving the lossless data traffic flow 600 and forwarding it to the networking device 206, and the networking device 206 receiving the lossless data traffic flow 600 and forwarding the lossless data traffic flow 600 on to its destination. Similarly, FIG. 6B illustrates the networking device 206 receiving a lossless data traffic flow 602 and forwarding it to the networking device 214, the networking device 214 receiving the lossless data traffic flow 602 and forwarding it to the networking device 212, and the networking device 212 receiving the lossless data traffic flow 602 and forwarding the lossless data traffic flow 600 on to its destination. Similarly as well, FIG. 6C illustrates the networking device 212 receiving a lossless data traffic flow 604 and forwarding it to the networking device 206, the networking device 206 receiving the lossless data traffic flow 604 and forwarding it to the networking device 214, and the networking device 214 receiving the lossless data traffic flow 214 and forwarding the data traffic flow 604 on to its destination.

Figure 6D:
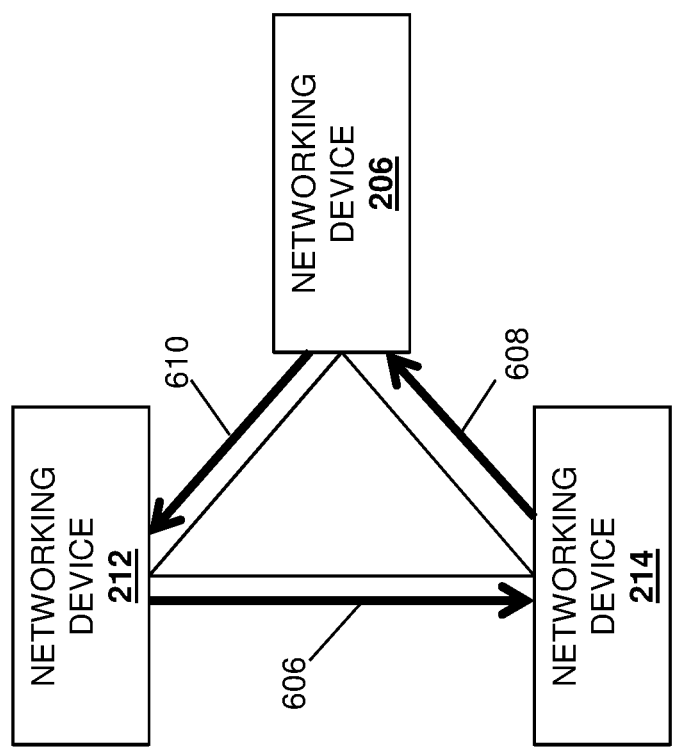
FIG. 6D is a schematic view illustrating an embodiment of a portion of the lossless data traffic deadlock management system of FIG. 2 operating during the method of FIG. 4.
Figure 6E:
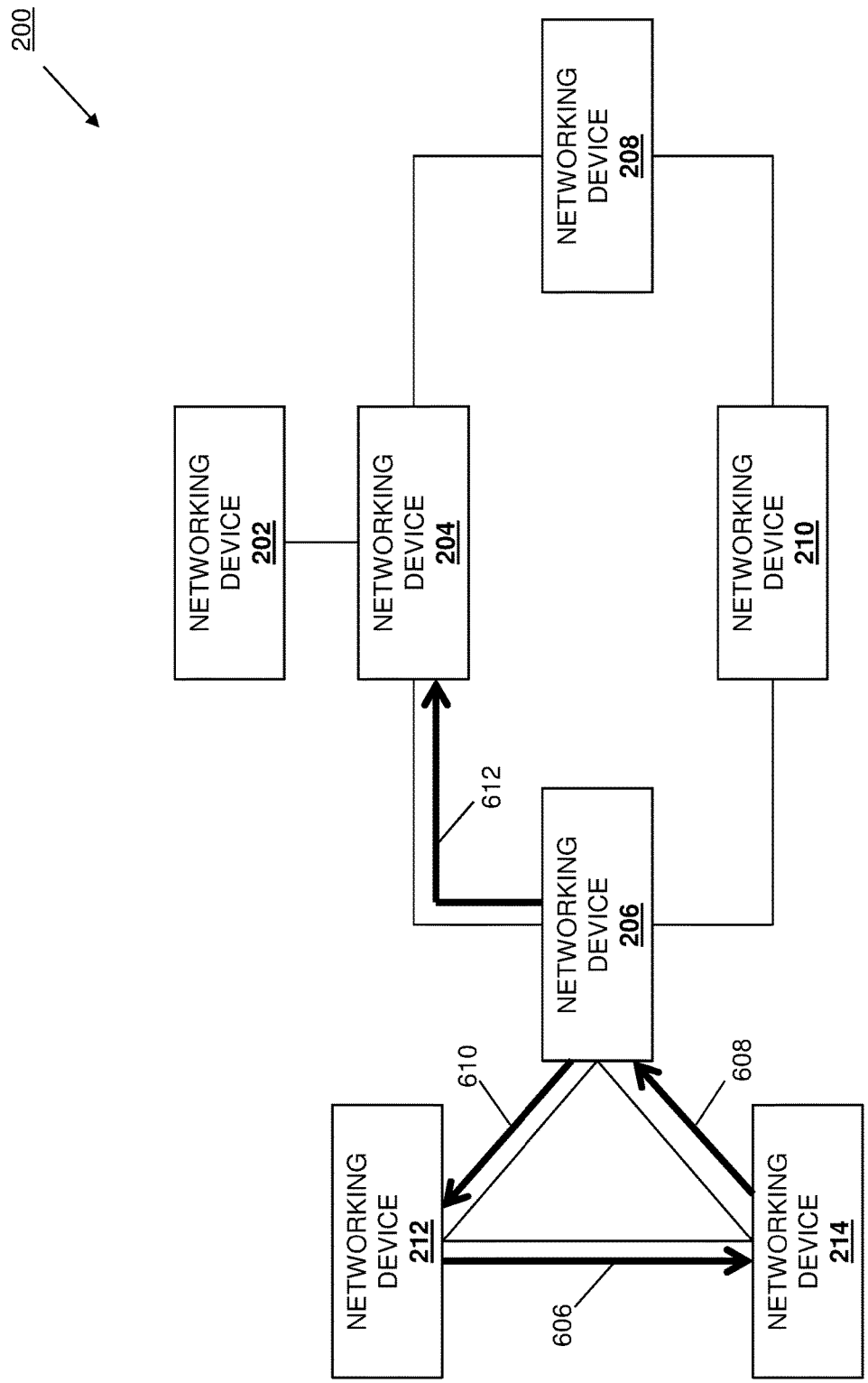
FIG. 6E is a schematic view illustrating the lossless data traffic deadlock management system of FIG. 2 operating during the method of FIG. 4.

As will be appreciated by one of skill in the art, each of the lossless data traffic flows 600, 602, and 604 may utilize one or more buffers in the networking devices 206, 212, and 214 that are dedicated to storing lossless data traffic packets/frames for forwarding by their respective networking device. As illustrated in FIG. 6D, in the event there is congestion in the networking device 212, a CBD situation may arise where a buffer/queue in the networking device 212 fills up with lossless data traffic packets/frames and causes the networking device 212 to send PFC pause frames 606 to the networking device 214, a buffer/queue in the networking device 214 fills up with lossless data traffic packets/frames and causes the networking device 214 to send PFC pause frames 608 to the networking device 206, a buffer/queue in the networking device 206 fills up with lossless data traffic packets/frames and causes the networking device 206 to send PFC pause frames 610 to the networking device 212, and so on. As will be appreciated by one of skill in the art in possession of the present disclosure, such CBD situations can result in a "PFC" deadlock situation (also referred to as a "PFC storm" situation) due to the filling of the buffers/queues in those networking devices 206, 212, and 214 with lossless data traffic packets/frames, and the high number of PFC pause frames being transmitted between the networking devices 206, 212, and 214. Furthermore, as illustrated in FIG. 6E, the CBD situation in the networking devices 206, 212, and 214 may result in a large number of PFC pause frames 612 being sent by the networking device 206 to the networking device 204 (as well as any other upstream devices that are directly connected to the networking devices 206, 212, and 214.)

However, while a particular congestion situation/deadlock has been described as being provided by a PFC deadlock/PFC storm situation, one of skill in the art in possession of the present disclosure will appreciate that other congestion situations may benefit from the teachings of the present disclosure as thus will fall within its scope as well. For example, Layer 2 (L2) loops in a portion of a network that includes the deadlock management system 200, incorrect Quality of Service (QoS) configuration in some networking devices in a network that includes the deadlock management system 200, a networking device with a full buffer/queue due to some other lossless data traffic situation, faulty Network Interface Controller(s) in networking devices in a network that includes the deadlock management system 200, and/or other situations known in the art may result in the congestion situation detected by the networking device 204 at block 404 while remaining within the scope of the present disclosure as well. As such, as block 404, the deadlock management engine 304 in the networking device 204 may receive congestion communications such as, for example, the PFC pause frames 612 transmitted by the networking device 206 as discussed above, via its communication system 308.

The method 400 the proceeds to block 406 where the first networking device identifies the first data traffic path as a congested route. In an embodiment, at block 406, the deadlock management engine 304 in the networking device 204/300 may identify the first data traffic path illustrated in FIG. 5 as a congested route. For example, as discussed above, the number of PFC pause frames received by the networking device 204 from the networking device 206 at block 404 may be relatively high and, at block 404 may exceed a deadlock detection rate that is indicative of a deadlock situation such as the PFC deadlock/PFC storm situation discussed above, which one of skill in the art in possession of the present disclosure will appreciate will put the networking device 204 in a state in which the networking device 204 will not forward lossless data traffic frames to the networking device 206 due to those PFC pause frames, and those lossless data traffic frames will be stored in the buffer/queue in the networking device 204 and, in some situations, may be dropped by the networking device 204. As such, at block 404, the deadlock management engine 304 in the networking device 204 may determine that the congestion communications received from the networking device 206 have been received at a rate that is indicative of a deadlock in the networking device 206 and/or that the networking device 204 has not been able to forward lossless data traffic to the networking device 206 for some time period such that its queue/buffer is filling up or has filled up. As will be appreciated by one of skill in the art in possession of the present disclosure, conventional deadlock management systems may operate such that the networking device 204 would drop the lossless data traffic flow 500 at the egress port connected to the networking device 206 when excessive PFC pause frames are received from the networking device 206.

The method 400 the proceeds to block 408 where the first networking device provides the lossless data traffic flow on a second data traffic path via a third networking device. In an embodiment, at block 408 an in response to determining that the first data traffic path illustrated in FIG. 5 is a congested route, the deadlock management engine 304 in the networking device 204/300 may begin providing the lossless data traffic flow 500 along a second data traffic path that does not include the networking device 206. As such, with reference to FIG. 7, the lossless data traffic flow 500 (e.g., generated by a source device, not illustrated) may be received by the networking device 202 and forward to the networking device 204 such that it is received by the deadlock management engine 304 in the networking device 204/300 via its communication system 308, and following the determination that the first data traffic path illustrated in FIG. 5 is a congested route, the deadlock management engine 304 in the networking device 204/300 may forward the lossless data traffic flow 500 to the networking device 208, with the networking device 208 receiving the lossless data traffic flow 500 and forwarding it the networking device 210, and the networking device 210 receiving the lossless data traffic flow 500 and forwarding it to its destination.

In a specific example of blocks 404, 406, and 408 discussed above, the deadlock management engine 304 in the networking device 204/300 may receive the congestion communication (e.g., the PFC pause frames) on a port that is connected to the networking device 206. In response to receiving the congestion communication, one or more application layers in the networking device 204 may scan through the routes that are reachable via the port that received the congestion communication and identify the networking device 206, may determine that the destination of the lossless data traffic 500 is reachable via the networking device 206, and identify the first data traffic path as the congested route by associating a congestion flag with the first data traffic path. As will be appreciated by one of skill in the art in possession of the present disclosure, the association of the congestion flag with the first data traffic path will indicate to the non-application layers in the networking device 204 to remove the reachability of the destination of the lossless data traffic 500 via the networking device 206, and cause that lossless data traffic to take an alternate route if it exists. In some embodiment, the deadlock management engine 304 in the networking device 204/300 may generate a congestion alarm for any next-hop neighbor device that is reachable via the port upon which the congestion communication was received, and/or may update the routes that have alternate paths in its deadlock management database 306 (i.e., other routes without alternate paths will not be affected.)

Figure 7:
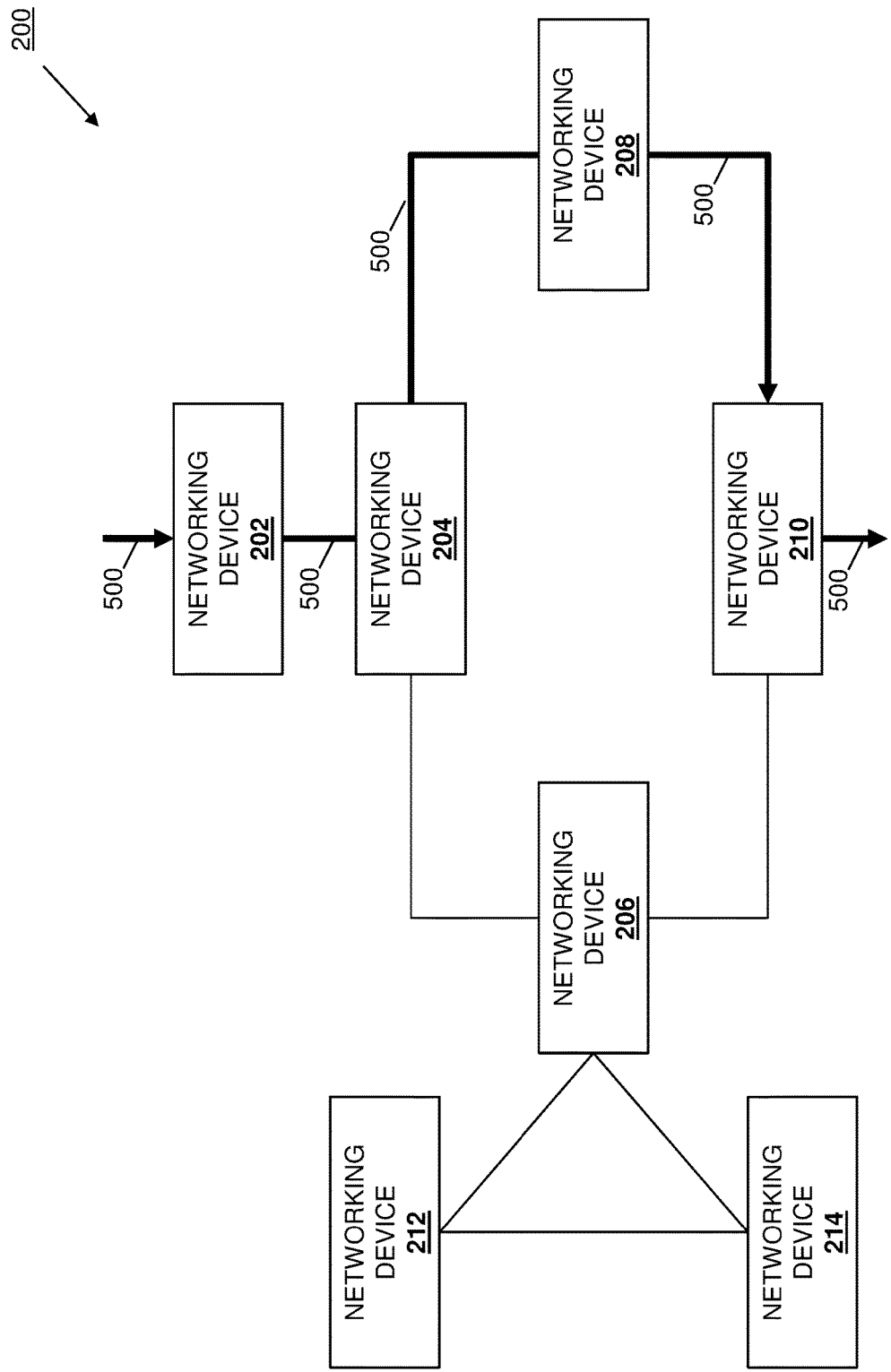
FIG. 7 is a schematic view illustrating the lossless data traffic deadlock management system of FIG. 2 operating during the method of FIG. 4.

As such, with reference to the example illustrated in FIG. 7, following the updating of the routes in the deadlock management database 306, the following ECMP route is stored in the deadlock management database 306 in the networking device 204 in association with the networking device 210: networking device 208, VLAN 20, port 2 (i.e., the previously stored route (route 1—networking device 206, VLAN 10, port 1) has been removed from the deadlock management database 306). As will be appreciated by one of skill in the art in possession of the present disclosure, in response to the route update, the lossless data traffic 500 will be provided via the second data traffic path illustrated in FIG. 7. In some embodiments, alternative routes like the second data traffic path discussed above may be limited to only routes having the same cost as the congested route in order to, for example, prevent any impact to the performance of longer alternative network paths available to the networking device 204. However, in some embodiments, routes with different costs (relative to the congested route) may be considered while remaining within the scope of the present disclosure as well.

The method 400 then proceeds to decision block 410 where it is determined whether the deadlock associated with the second networking device no longer exists. In an embodiment, at decision block 410, the deadlock management engine 304 in the networking device 204/300 may then monitor to determine whether the number of PFC pause frames received by the networking device 204 from the networking device 206 continues to exceed the deadlock detection rate that is indicative of the deadlock situation such as the PFC deadlock/PFC storm situation discussed above, and/or whether the networking device 204 has been unable to forward lossless data traffic frames to the networking device 206 for some period of time. As such, at decision block 410, the deadlock management engine 304 in the networking device 204 may determine whether the congestion communications received from the networking device 206 continue to be received at the rate that is indicative of a deadlock in the networking device 206, and/or whether the networking device 204 has been unable to forward lossless data traffic frames to the networking device 206 for some period of time. If, at decision block 410, it is determined that the deadlock associated with the second networking device continues to exist, the method 400 returns to block 408. As such, the method 400 may operate to provides the lossless data traffic flow 500 on the second data traffic path illustrated in FIG. 7 and via a networking device 208 as long as the deadlock situation continues to exists in the networking device 206.

If, at decision block 410, it is determined that the deadlock associated with the second networking device no longer exists, the method 400 proceeds to block 412 where the first networking device removes the identification of the first data traffic path as a congested route. In an embodiment, if at block 410 the deadlock management engine 304 in the networking device 204/300 determines that the congestion communications received from the networking device 206 are below the rate that is indicative of a deadlock in the networking device 206, and/or that the networking device 204 has able to forward lossless data traffic frames to the networking device 206 within some period of time, at block 412 the deadlock management engine 304 in the networking device 204/300 may remove the identification of the first data traffic path illustrated in FIG. 5 as a congested route. The method 400 then proceeds to block 414 where the first networking device provides the lossless data traffic flow on the first path via the second networking device. In an embodiment, at block 414 and in response identifying the first data traffic path as not-congested, the deadlock management engine 304 in the networking device 204/300 may then operate to forward the lossless data traffic flow 500 on the first data traffic path illustrated in FIG. 5.

In a specific example of blocks 410, 412, and 414 discussed above, the deadlock management engine 304 in the networking device 204/300 may determine that the congestion communications (e.g., the PFC pause frames) are no longer being received at a relatively high rate (or at all) on the port that is connected to the networking device 206, and/or that the networking device 204 has been able to forward lossless data traffic frames to the networking device 206 after some period of time of not being able to do so. In response, one or more application layers in the networking device 204 may scan through the routes that are reachable via that port and identify the networking device 206, determine that the destination of the lossless data traffic 500 is reachable via the networking device 206, and reset the congestion flag that was previously associated with the first data traffic path to identify it as a congested route. As will be appreciated by one of skill in the art in possession of the present disclosure, the resetting of the congestion flag associated with the first data traffic path will indicate to the non-application layers in the networking device 204 to add the reachability of the destination of the lossless data traffic 500 via the networking device 206, and allow that lossless data traffic to take the first data traffic path.

In some embodiment, the deadlock management engine 304 in the networking device 204/300 may clear any congestion alarms for any next-hop neighbor device that is reachable via the port that is no longer associated with the congestion, and/or may update the routes in its deadlock management database 306. As such, with reference to the example illustrated in FIG. 5, following the updating of the routes in the deadlock management database 306, the following ECMP routes are once again stored in the deadlock management database 306 in the networking device 204 in association with the networking device 210: route 1—networking device 206, VLAN 10, port 1; and route 2—networking device 208, VLAN 20, port 2 (i.e., the previously removed route (route 1—networking device 206, VLAN 10, port 1) has been added back to the deadlock management database 306). As will be appreciated by one of skill in the art in possession of the present disclosure, in response to the route update, the lossless data traffic 500 will be provided via the first data traffic path illustrated in FIG. 5.

Thus, systems and methods have been described that provide for the transmission of lossless data traffic with improved resolution of deadlocks without the issues associated with conventional deadlock management techniques discussed above. As discussed below, in some embodiments, such deadlock resolution may be accomplished by a first networking device that provides a lossless data traffic flow on a first data traffic path via a second networking device and to a destination, receives a congestion communication from the second networking device that is indicative of a deadlock associated with the second networking device and, in response, identifies the first data traffic path as a congested route to cause the first networking device to provide the lossless data traffic flow on a second data traffic path via a third networking device to the destination. As described above, this allows the first networking device to increase the performance of lossless data traffic transmission a between a source device and the destination device by rerouting traffic around deadlocks, while allowing deadlocks to resolve more quickly than in conventional systems due to decreased amount of lossless data traffic sent to the congested networking device, and reducing data traffic losses that may occur due to deadlocks when an alternate path exists. As will be appreciated by one of skill in the art in possession of the present disclosure, the systems and methods of the present disclosure provide a localized solution that modifies the routes in a particular networking device, while all other networking devices/nodes in the network are unaffected.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A lossless data traffic deadlock management system, comprising:
   a second networking device;
   a third networking device; and
   a first networking device that is coupled to the second networking device and the third networking device, wherein the first networking device is configured to:
      provide, on a first data traffic path via the second networking device and to a destination, a lossless data traffic flow;
      receive, from the second networking device via a port that is connected to the second networking device, a plurality of congestion communication;
      identify, from the plurality of congestion communications, that the second networking device is involved in a Cyclic Buffer Dependency (CBD) deadlock;
      identify, via at least one application layer, that the first data traffic path is provided via a route that is included in one or more routes that are reachable via the second networking device that is connected to the port; and
      identify, in response to identifying that the second networking device is involved in the CBD deadlock, the first data traffic path as a congested route by associating a congestion flag with the first data traffic path, wherein the identification of the first data traffic path as the congested route causes the first networking device to provide the lossless data traffic flow on a second data traffic path via the third networking device to the destination, and causes a removal of the first data traffic path as a possible route for the lossless data traffic flow.

2. The system of claim 1, wherein the first networking device is configured to:
   remove, via at least one non-application layer, a reachability of the destination via the second networking device, wherein the removal of the reachability of the destination via the second networking device causes the first networking device to provide the lossless data traffic flow on the second data traffic path via the third networking device to the destination.

3. The system of claim 1, wherein the first networking device is configured to:
generate, in response to identifying the first data traffic path as the congested route, a congestion alarm for the one or more routes that are reachable via the second networking device that is connected to the port.

4. The system of claim 1, wherein the first networking device is configured to:
determine that second networking device is no longer involved in the CBD deadlock; and
remove, in response to determining that the second networking device is no longer involved in the CBD deadlock, the identification of the first data traffic path as the congested route, wherein the removal of the identification of the first data traffic path as the congested route causes the first networking device to provide the lossless data traffic flow on the first data traffic path via the second networking device to the destination.

5. The system of claim 4, wherein the first networking device is configured to:
receive, on the port that is connected to the second networking device, a decongested communication that is indicative that the second networking device is no longer involved in the CBD deadlock;
identify, via at least one application layer, the second networking device that is connected to the port;
determine that the destination is reachable utilizing the first data traffic path via the second networking device; and
remove the identification of the first data traffic path via the second networking device as the congested route by resetting a congestion flag associated with the first data traffic path.

6. An Information Handling System (IHS), comprising:
a processing system; and
a memory system that is coupled to the processing system and that includes instructions that, when executed by the processing system, cause the processing system to provide a deadlock management engine that is configured to:
provide, on a first data traffic path via a second networking device and to a destination, a lossless data traffic flow;
receive, from the second networking device via a port that is connected to the second networking device, a plurality of congestion communication;
identify, from the plurality of congestion communications, that the second networking device is involved in a Cyclic Buffer Dependency (CBD) deadlock;
identify, via at least one application layer, that the first data traffic path is provided via a route that is included in one or more routes that are reachable via the second networking device that is connected to the port; and
identify, in response to identifying that the second networking device is involved in the CBD deadlock, the first data traffic path as a congested route by associating a congestion flag with the first data traffic path, wherein the identification of the first data traffic path as the congested route causes the first networking device to provide the lossless data traffic flow on a second data traffic path via a third networking device to the destination, and causes a removal of the first data traffic path as a possible route for the lossless data traffic flow.

7. The IHS of claim 6, wherein the deadlock management engine is configured to:
remove, via at least one non-application layer, a reachability of the destination via the second networking device, wherein the removal of the reachability of the destination via the second networking device causes the first networking device to provide the lossless data traffic flow on the second data traffic path via the third networking device to the destination.

8. The IHS of claim 6, wherein the deadlock management engine is configured to:
generate, in response to identifying the first data traffic path as the congested route, a congestion alarm for the one or more routes that are reachable via the second networking device that is connected to the port.

9. The IHS of claim 6, wherein the deadlock management engine is configured to:
determine that the second networking device is no longer involved in the CBD deadlock; and
remove, in response to determining that the second networking device is no longer involved in the CBD deadlock, the identification of the first data traffic path as the congested route, wherein the removal of the identification of the first data traffic path as the congested route causes the first networking device to provide the lossless data traffic flow on the first data traffic path via the second networking device to the destination.

10. The IHS of claim 9, wherein the deadlock management engine is configured to:
receive, on the port that is connected to the second networking device, a decongested communication that is indicative that the second networking device is no longer involved in the CBD deadlock;
identify, via at least one application layer, the second networking device that is connected to the port;
determine that the destination is reachable utilizing the first data traffic path via the second networking device; and
remove the identification of the first data traffic path via the second networking device as the congested route by resetting a congestion flag associated with the first data traffic path.

11. The IHS of claim 6, wherein congestion communication is a Priority Flow Control (PFC) communication.

12. A method for managing deadlocks for lossless data traffic, comprising:
providing, by a first networking device on a first data traffic path via a second networking device and to a destination, a lossless data traffic flow;
receiving, by the first networking device via a port that is connected to the second networking device, a plurality of congestion communications;
identify, by the first networking device from the plurality of congestion communications, that the second networking device is involved in a Cyclic Buffer Dependency (CBD) deadlock;
identifying, by the first network device via at least one application layer, that the first data traffic path is provided via a route that is included in one or more routes that are reachable via the second networking device that is connected to the port; and
identifying, by the first networking device in response to identifying that the second networking device is involved in the CBD deadlock, the first data traffic path as a congested route by associating a congestion flag with the first data traffic path, wherein the identification of the first data traffic path as the congested route causes the first networking device to provide the lossless data traffic flow on a second data traffic path via a third networking device to the destination, and causes a removal of the first data traffic path as a possible route for the lossless data traffic flow.

13. The method of claim 12, further comprising:
removing, by the first networking device via at least one non-application layer, a reachability of the destination via the second networking device, wherein the removal of the reachability of the destination via the second networking device causes the first networking device to provide the lossless data traffic flow on the second data traffic path via the third networking device to the destination.

14. The method of claim 12, further comprising:
generating, by the first networking device, in response to identifying the first data traffic path as the congested route, a congestion alarm for the one or more routes that are reachable via the second networking device that is connected to the port.

15. The method of claim 12, further comprising:
determining, by the first networking device, that the second networking device is no longer involved in the CBD deadlock; and
removing, by the first networking device in response to determining that the second networking device is no longer involved in the CBD deadlock, the identification of the first data traffic path as the congested route, wherein the removal of the identification of the first data traffic path as the congested route causes the first networking device to provide the lossless data traffic flow on the first data traffic path via the second networking device to the destination.

16. The method of claim 15, further comprising:
receiving, by the first networking device on the port that is connected to the second networking device, a decongested communication that is indicative that the second networking device is no longer involved in the CBD deadlock;
identifying, by the first networking device via at least one application layer, the second networking device that is connected to the port;
determining, by the first networking device, that the destination is reachable utilizing the first data traffic path via the second networking device; and
removing, by the first networking device, the identification of the first data traffic path via the second networking device as the congested route by resetting a congestion flag associated with the first data traffic path.

17. The method of claim 12, wherein congestion communication is a Priority Flow Control (PFC) communication.

\* \* \* \* \*